United States Patent [19]

Ueda

[11] Patent Number: 4,527,647
[45] Date of Patent: Jul. 9, 1985

[54] HOPPER AND SUPPORT DEVICE THEREFOR IN AUTOMATIC WEIGHING APPARATUS

[75] Inventor: Kenji Ueda, Kyoto, Japan

[73] Assignee: Kabushiki Kaisha Ishida Koki Seisakusho, Kyoto, Japan

[21] Appl. No.: 537,669

[22] Filed: Sep. 30, 1983

[30] Foreign Application Priority Data

Oct. 1, 1982 [JP] Japan .................. 57-149837[U]
Oct. 1, 1982 [JP] Japan .................. 57-149838[U]
Oct. 9, 1982 [JP] Japan .................. 57-153624[U]

[51] Int. Cl.³ ............................ G01G 13/18
[52] U.S. Cl. ..................... 177/105; 177/58; 177/112; 177/253; 248/222.2; 108/108; 222/77; 74/469
[58] Field of Search .............. 177/105, DIG. 12, 90, 177/100, 112, 58, 253; 248/133, 304, 407, 456, 222.2; 108/108; 74/469; 222/77, 556, 557, 558

[56] References Cited

U.S. PATENT DOCUMENTS 3,098,537 7/1963 Petrea .................. 177/253 X
4,399,880 8/1983 Konishi .............. 177/DIG. 12 X

FOREIGN PATENT DOCUMENTS 2228136 12/1973 Fed. Rep. of Germany ...... 248/133
2621477 11/1977 Fed. Rep. of Germany ...... 177/105
787219 12/1957 United Kingdom ............. 248/222.2

Primary Examiner—E. A. Goldberg
Assistant Examiner—Fred L. Kampe
Attorney, Agent, or Firm—Staas & Halsey

[57] ABSTRACT

A hopper for an automatic weighing apparatus has a link mechanism for opening and closing a hopper gate and an attachment mechanism for attaching a hopper body to the automatic weighing apparatus. The link mechanism includes a drive link pivotably mounted on a bracket, a follower link angularly movable in unison with the gate, and an intermediate link interconnected between the movable ends of the drive and follower links. When the gate is closed, the drive and intermediate links are aligned along a substantially straight line to prevent the weight of articles in the hopper from opening the gate. The attachment mechanism includes a pair of brackets attached to and projecting from the hopper, two parallel shafts mounted on and between the brackets, at different distances from the hopper body, and an attachment member mounted on the automatic weighing apparatus and having upwardly opening recesses for receiving the shaft closest to the hopper body and downwardly opening recesses for receiving the shaft farthest from the hopper body.

5 Claims, 17 Drawing Figures

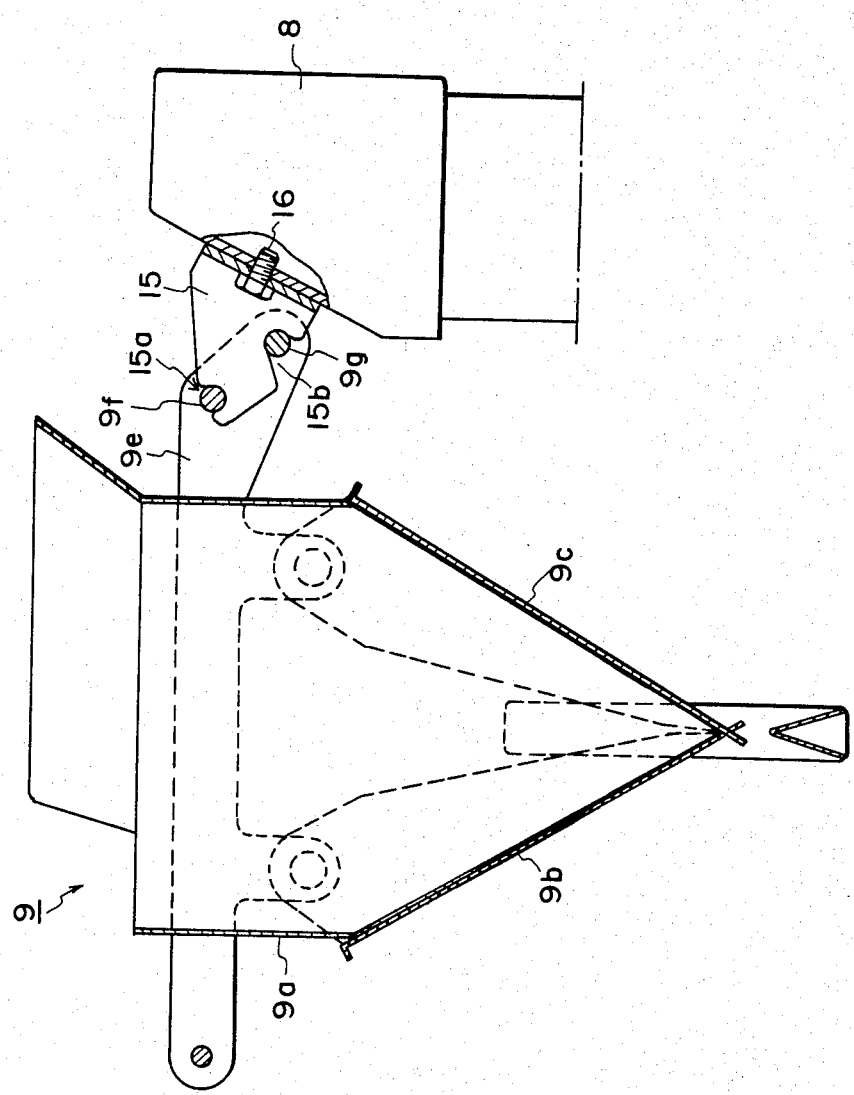

HOPPER AND SUPPORT DEVICE THEREFOR IN AUTOMATIC WEIGHING APPARATUS

BACKGROUND OF THE INVENTION

The present invention relates to a hopper for use in an automatic weighing apparatus, and more particularly to a mechanism for opening and closing a hopper gate and a support device for such a hopper.

A conventional automatic combinatorial weighing apparatus has a plurality of weighing machines arranged in a circular pattern and finds weights of batches of articles supplied to the weighing machine. Articles of a certain desired total weight can be obtained by selecting a combination of determined weights which is optimum for the desired total weight and discharging those articles contained in the selected weighing machines. Each of the weighing machines is equipped with a weighing hopper for containing a batch of articles therein and a pool hopper disposed upwardly of the weighing hopper for quickly supplying a next batch of articles to be weighed into the weighing hopper when the previously weighed batch of articles has been discharged from the weighing hopper.

The weighing hopper has a gate for opening and closing its article discharge port and a link mechanism actuatable under the control of an external source for opening and closing the gate. The weighing apparatus also has an attachment mechanism for attaching each weighing hopper to the companion weighing machine. Conventional hoppers are disadvantageous in that they are quite complex in structure, highly costly to construct, and heavy.

The above automatic weighing apparatus is normally used in combination with a packaging apparatus which is supplied with articles discharged through a collection chute from the weighing hoppers of the selected weighing machines. To increase the article handling capability, the automatic weighing apparatus is controlled to enable the weighing hoppers to discharge the weighed articles into the collection chute and also to enable the pool hoppers to charge next batches of articles into the weighing hoppers substantially at the same time making any loss of time as small as possible. Alternatively, each of the weighing hoppers is provided with two gates, and the collection chute is of a double construction composed of an outer chute for receiving articles discharged from one of the gates of the weighing hopper and an inner chute for receiving articles discharged from the other gate thereof. The two gates of each weighing hopper are alternately opened and closed to discharge the articles alternately into the inner and outer collection chutes, thereby shortening the time interval in which the articles are supplied from the weighing apparatus into the packaging apparatus.

The two gates on each weighing hopper are coupled with respective link mechanisms for opening and closing the gates, the prior link mechanisms being mounted independently on opposite outer side surfaces of a hopper body. This arrangement has resulted in an increased hopper width or an increased amount of space being taken up by each hopper. The hoppers are therefore arranged at wide pitches, with the consequence that the automatic weighing apparatus with the circularly arranged weighing machines is large in overall size, or the number of weighing machines installed is limited, a limitation which has been an obstacle to efforts to improve the weighing accuracy.

With the automatic combinatorial weighing apparatus of the type described above, the pool hoppers are removably attached to the weighing machines or removably installed in other attachment positions for cleaning purpose.

FIGS. 1 through 3 of the accompanying drawings show a general conventional hopper attachment construction by way of example. An attachment plate B is fixed to a mount structure A such as a weighing machine, and a pair of guide members D, D having an L-shaped cross section are mounted on a hopper C. The hopper C is installed on the mount structure A by inserting the attachment plate B between the guide members D, D. With this construction, it is tedious and time-consuming to manufacture the components since the back surfaces of the attachment plate B and the hopper C held in contact therewith and the inner surfaces of the guide members D, D should be finished so as to have the required shape and flatness. Any gap or backlash between the attachment plate and the guide members causes the hopper to vibrate or wobble due to vibrations of the apparatus and shocks imposed when the gate is opened and closed. Vibrations or wobbling movements of the weighing hoppers attached to the weighing machines adversely affect the weighing machine and result in a reduced degree of weighing accuracy.

SUMMARY OF THE INVENTION

With the foregoing prior drawbacks in view, it is an object of the present invention to provide a simplified link mechanism for opening and closing the gate of a hopper and a simplified attachment construction for the hopper in an automatic weighing apparatus so that the link mechanism and the attachment construction can be manufactured to be lightweight and low in cost.

Another object of the present invention is to provide compact double-wing weighing hoppers in an automatic weighing apparatus which render the overall automatic weighing apparatus compact in size, achieve an increased weighing accuracy, and make certain components of a link mechanism for opening and closing two gates of the double-wing weighing hopper shareable by the two gates, so that the link mechanism is simple in structure, lightweight, and inexpensive to manufacture.

Still another object of the present invention is to provide lightweight weighing hoppers for effectively eliminating any vibrations transmitted therefrom to a weighing machine, thus stabilizing operation of the weighing machine.

A still further object of the present invention is to provide a support device which can easily be manufactured and is capable of removably supporting a hopper firmly in place without allowing the hopper to vibrate and wobble.

According to the present invention, a link mechanism for opening and closing a hopper in an automatic weighing apparatus is simplified in construction, and components of the link mechanism and an attachment mechanism for the hopper are partly shared with each other. With an automatic weighing apparatus having a plurality of circularly arranged weighing machines each equipped with two gates, link mechanisms for opening and closing the two gates on hoppers are mounted on outer side surfaces of the hopper bodies. A hopper attachment construction comprises a pair of brackets projecting laterally from each hopper body, two parallel shafts extending between the brackets, and an attachment member mounted on a hopper attachment and having upwardly and downwardly opening recesses for receiving the parallel shafts.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 17 is a vertical cross-sectional view taken along line VIII—VIII of FIG. 16.

DESCRIPTION OF THE PREFERRED EMBODIMENTS

Figure 1:
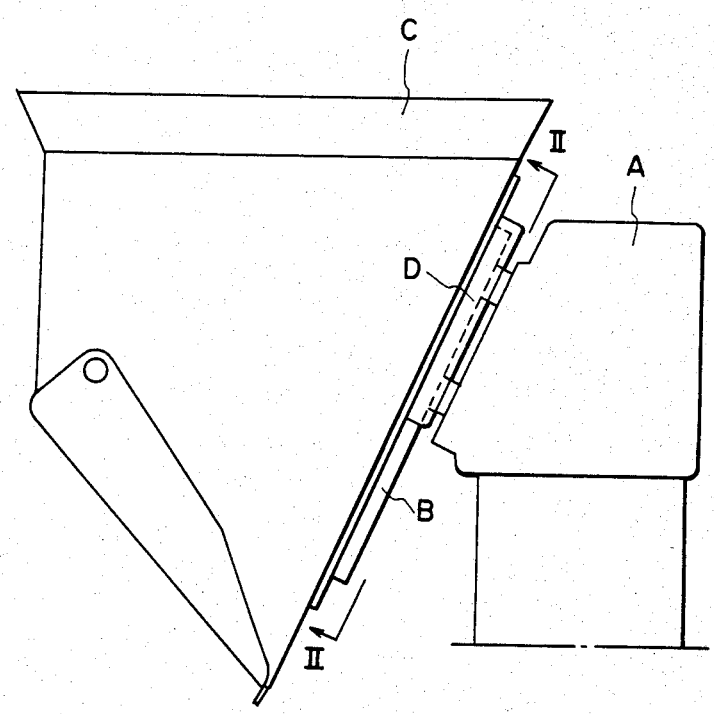
FIG. 1 is a side elevational view of a conventional hopper attachment construction.
Figure 2:
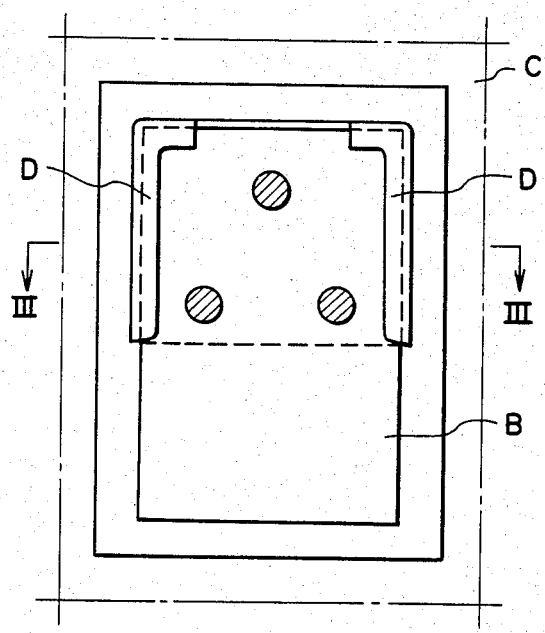
FIG. 2 is a cross-sectional view taken along line II—II of FIG. 1.
Figure 3:
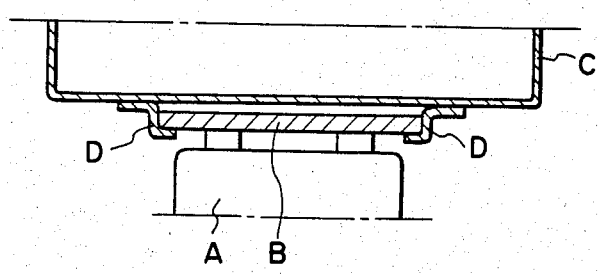
FIG. 3 is a cross-sectional view taken along line III—III of FIG. 2.
Figure 4:
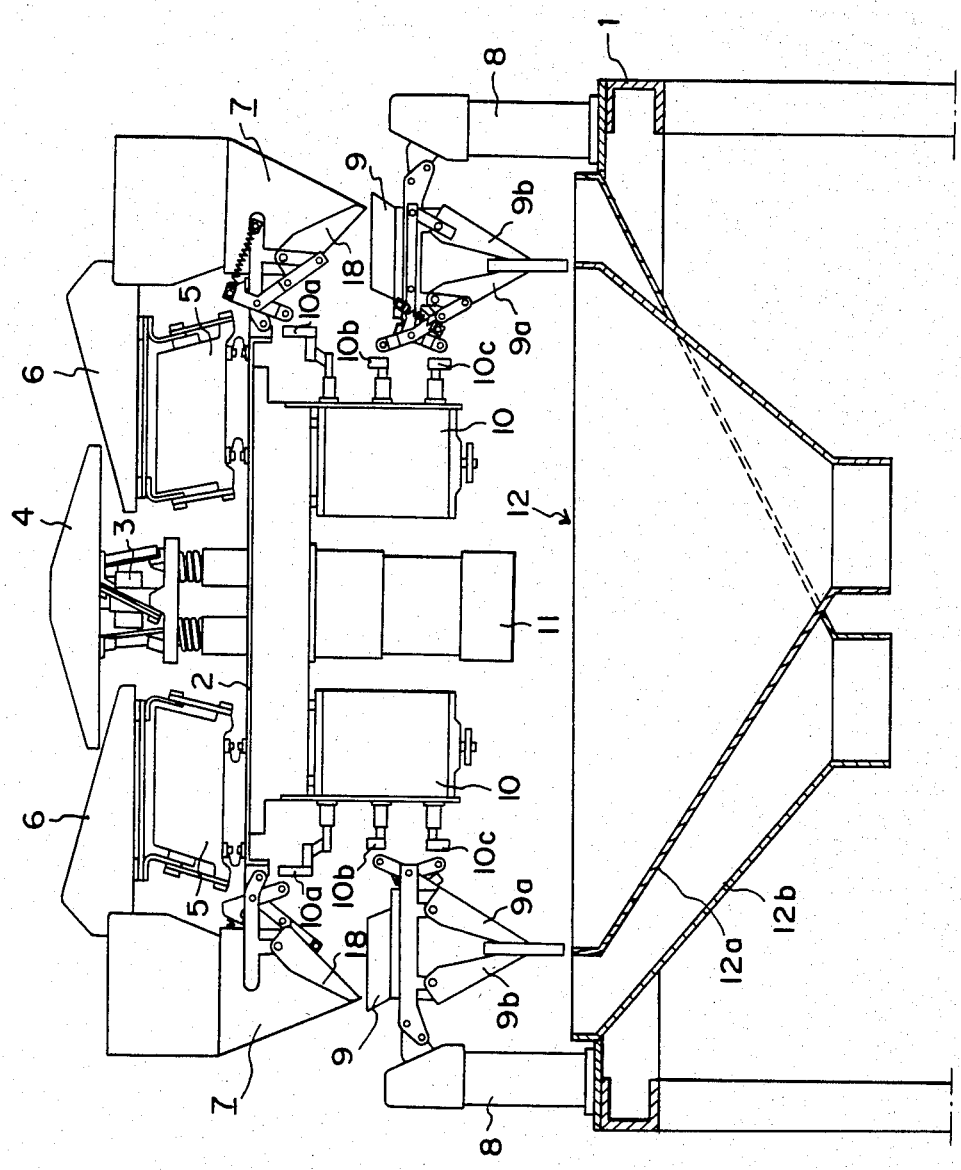
FIG. 4 is a vertical cross-sectional view of an automatic weighing apparatus in which the present invention is incorporated.

FIG. 4 illustrates the overall construction of an automatic weighing apparatus to which the present invention is applied.

The automatic weighing apparatus including a base 1, a support table 2 mounted on and positioned above the base 1 and an article dispersion table 4 supported centrally on the support table 2 by a vibrator unit 3. A plurality of supply troughs 6 are disposed radially around the article dispersion table 4 and supported respectively by vibrator units 5 on the support table 2, and a plurality of pool hoppers 7 equal in number to the supply troughs 6 are mounted on the peripheral edge of the support table 2, the pool hoppers 7 being positioned downwardly of radially outward edges of the supply troughs 6. The automatic weighing apparatus also includes a plurality of weighing machines 8 mounted on the base 1 as a circular array in radial alignment with the supply troughs 6 or the pool hoppers 7, and a plurality of weighing hoppers 9 attached respectively to the weighing machines 8 and located below the pool hoppers 7, respectively. A plurality of driver units 10 depend from a lower surface of the support table 2. The driver units 10 are actuatable by a motor 11 mounted on the lower surface of the support table 2. The driver units 10, cause the pool hoppers 7 and the weighing hoppers 9 to discharge articles in response to article discharge commands. A collection chute or receiving means 12 is mounted on the base 1 below the weighing hoppers 9 and has a wide upper opening for receiving the articles discharged from the weighing hoppers 9. Each of the weighing hoppers 9 is of the double-wing type having two gates 9a, 9b. Therefore, the collection chute 12 is composed of an inner chute 12a for receiving the articles discharged from the gate 9a of each weighing hopper 9 and an outer gate 12b for receiving the articles discharged from the gate 9b of each weighing hopper 9.

Figure 5:
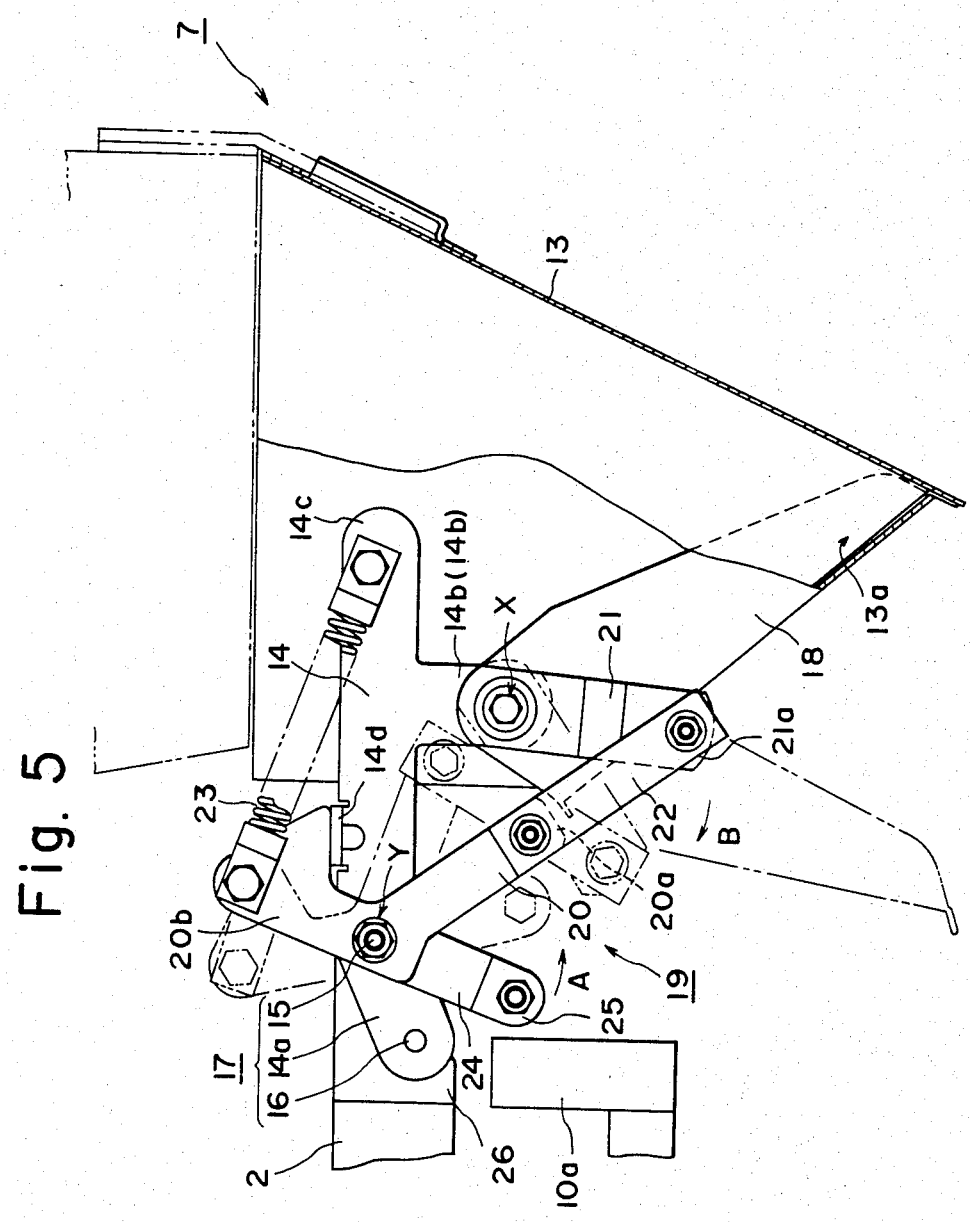
FIG. 5 is a side elevational view of a hopper according to an embodiment of the present invention.
Figure 6:
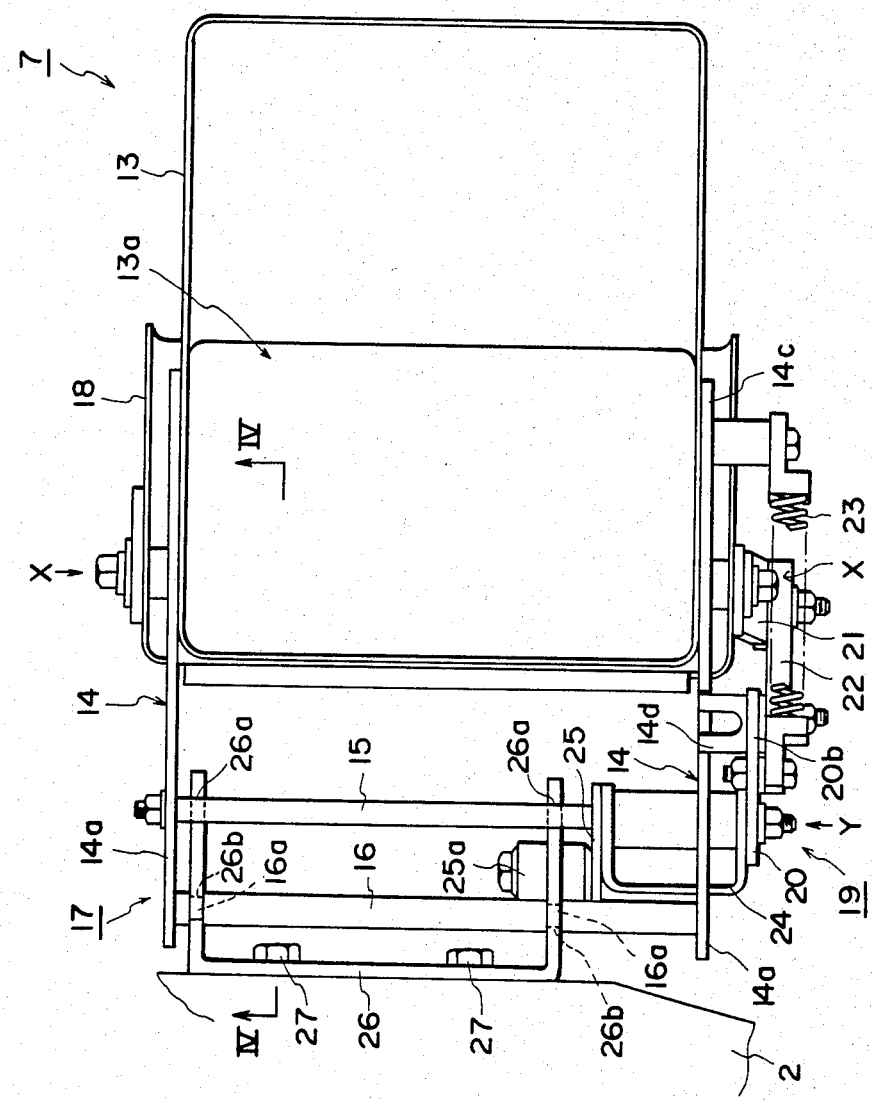
FIG. 6 is a plan view of the hopper shown in FIG. 5.

The construction of each of the pool hoppers 7 will be described in detail with reference to FIGS. 5 and 6. The pool hopper 7 comprises a body 13 having an upper opening and a lower article discharge port 13a. A pair of T-shaped brackets 14, 14 are fixed to the lateral sides, respectively, of the body 13 and having projections 14a, 14a extending laterally (to the left as shown) from the body 13, and two parallel shafts 15, 16 extending between the projections 14a, 14a and positioned out of horizontal alignment in differently spaced relationship to the body 13. The projections 14a, 14a and the shafts 15, 16 jointly constitute an attachment mechanism 17 for the pool hopper 7. A gate 18 for opening and closing the article discharge port 13a is swingably supported on lower projecting ends 14b, 14b of the brackets 14, 14. The gate 18 can be opened and closed by a link mechanism 19 composed of a drive link 20 pivotably supported on one of the projections 14a of the brackets 14, 14, a follower link 21 swingably movable with the gate 18 about a pivot X of the swingable moment of the gate 18, and an intermediate link 22 interconnecting swingable ends 20a, 21a of the drive link 20 and the follower link 21, respectively. The drive link 20 includes an extension 20b extending away from the swingable end 20a of the drive link beyond a pivot Y of the swingable moment of the drive link 20. A return spring 23 is coupled between the extension 20b and a projection 14c of the bracket 14 which extends away from the drive link 20. The bracket 14 has a stopper 14d for stopping the angular movement caused by the spring 23 of the drive link 20 at a fixed position upon engagement with the extension 20b. An actuation lever 25 is fixed to the drive link 20 via a channel-shaped connector 24 extending around the projection 14a of the bracket 14 and has an actuatable end 25 disposed in the vicinity of or in confronting relation to a pusher member 10a (FIG. 4) of the corresponding driver unit 10. When the extension 20b of the drive link 20 is held in abutment against the stopper 14d, the gate 18 closes the discharge port 13a of the body 13, and the drive link 20 and the intermediate link 22 are substantially aligned with each other as a toggle mechanism. In the illustrated embodiment, the drive link 20 and the connector 24 and actuation lever 25 fixed thereto are supported on the shaft 15 which is closer to the body than the shaft 16. The shaft 15 serves as the pivot Y for the angular movement of the drive link 20, the connector 24 and actuation lever 25. As shown in FIGS. 5 and 6, a channel-shaped attachment member 26 is fastened by bolts 27, 27 to an attachment (the peripheral edge of the support table 2) for the pool hopper 7. The attachment member 26 has in opposite sides thereof upwardly opening recesses 26a, 26a receptive of the shaft 15 and downwardly opening recesses 26b, 26b receptive of the shaft 16. The shaft 16 has smaller-diameter portions 16a, 16a which engage the recesses 26b, 26b so that the shaft 16 will not be laterally displaced when the pool hopper 7 is mounted on the attachment member 26.

Operation of the automatic weighing apparatus of the foregoing construction is as follows: Articles are dispersively supplied from the dispersion table 4 through the supply troughs 6 and the pool hoppers 7 as batches into the weighing hoppers 9, and then weighed respectively by the weighing hoppers 9. An optimum combination of measured weights is selected to achieve a desired total weight. The selected articles which have the desired total weight are discharged from the selected weighing hoppers into the inner chute 12a or outer chute 12b of the collection chute 12 when either the gates 9a or the gates 9b of each of the selected weighing hoppers are opened by projecting movement of pusher members 10b or pusher members 10c of the corresponding driver units 10. The discharged articles are collected by the selected chute, and then supplied to a packaging apparatus (not shown) disposed below the collection chute. Pusher members 10a of the driver units 10 project toward each of the pool hoppers 7 from which the articles have been discharged, thereby opening the gate 18 of the corresponding pool hopper 7 positioned above the weighing hopper. A next batch of articles is immediately supplied from the pool hopper 7 in preparation for the next cycle of the weighing operation.

When the pusher member 10a of the driver unit 10 projects to push the actuatable end 25 of the actuation lever 25, the actuation lever 25, the connector 24, and the drive link 20 are angularly moved in unsion in the direction of the arrow A against the force of the return spring 23 into the position shown by the two-dot-and-dash lines in FIG. 5. The turning movement of the drive link 20 causes the intermediate link 22 to turn or rotate the follower link 21 in the direction of the arrow B and the gate 18 is turned by the follower link 21 to open the discharge port 13a of the body 13. As the pusher member 10a of the driver unit 10 is retracted, the links 10, 21, 22 are returned to the solid-line position of FIG. 5 under the tension of the return spring 23, thereby closing the discharge port 13a. With the gate 18 closed, the drive link 20 and the intermediate link 22 are positioned in a so-called dead point relative to each other. Accordingly, the gate 18 remains closed even when it is subjected to the weight of supplied articles or to a shock at the time articles are charged into the pool hopper 7.

Figure 7:
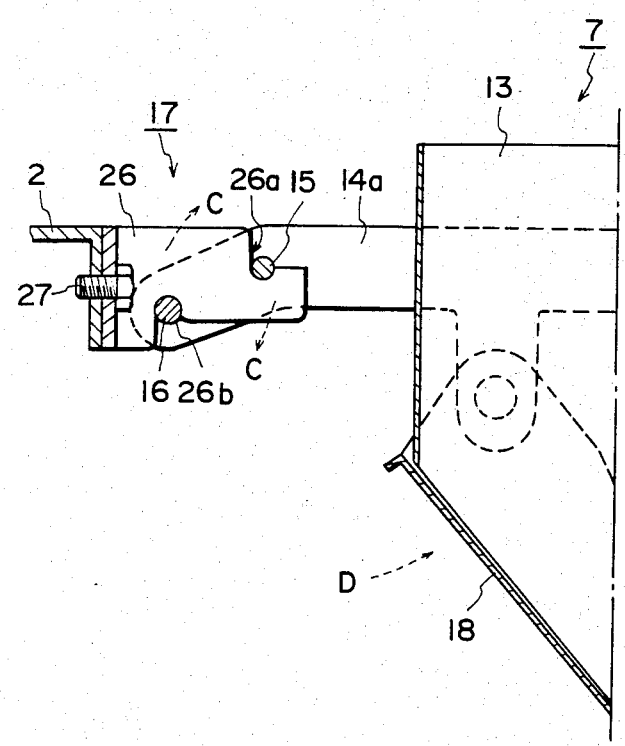
FIG. 7 is a fragmentary vertical cross-sectional view taken along line IV—IV of FIG. 6.

The pool hopper 7 is supported on the attachment member 26 affixed to the peripheral edge of the support table 2 by means of the attachment mechanism 17 composed of the shafts 15, 16 extending between the projections 14a, 14a of the brackets 14, 14. A moment exerted in the direction of the arrows C, C (FIG. 7) by the weight of the pool hopper 7 and the weight of the articles contained therein is borne by the attachment member 26 with the shafts 15, 16 received in the upwardly opening recesses 26a, 26a and the downwardly opening recesses 26b, 26b. Thus, the pool hopper 7 is supported firmly against vibrations or wobbling movements through the above simple construction, unless an external moment greater than the above moment is applied in the direction opposite to that of the arrows C. The pool hopper 7 can nevertheless be detached with utmost ease simply by tiltinig the pool hopper 7 in the direction of the arrow D.

In the foregoing embodiment, the drive link 20 in the gate opening and closing link mechanism 19 is supported on one of the brackets 14, 14 which constitute the attachment mechanism 17 for pivotable movement about one of the shafts 15, 16 extending between the brackets 14, 14. Stated in another manner, one of the brackets 14 and one of the shafts 15 are shared by the mechanisms 17, 19, a construction which simplifies the pool hopper equipped with the gate opening and closing link mechanism and the attachment mechanism of the present invention.

Figure 8:
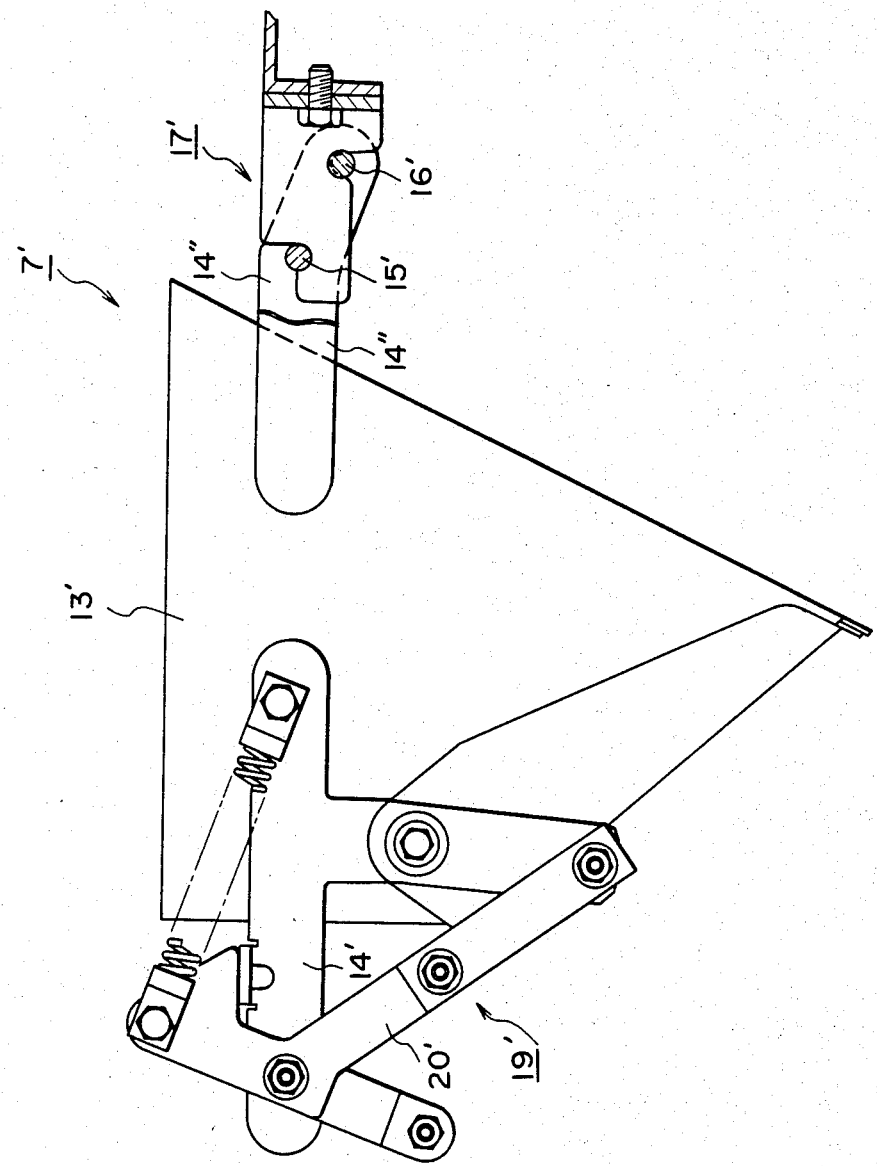
FIG. 8 is a side elevational view of a hopper according to another embodiment of the present invention.

Although the foregoing embodiment is directed to the pool hoppers in the automatic weighing apparatus, the present invention is equally applicable by utilizing the same construction as above to weighing hoppers in which a gate opening and closing link mechanism and an attachment mechanism are mounted on the same side of the weighing hopper. In the case where the gate opening and closing link mechanism and the attachment mechanism are mounted on opposite sides, respectively, of the hopper body, as shown in FIG. 8, a drive link 20' of a gate opening and closing link mechanism 19' is pivotably supported on a bracket 14' projecting from one side of a body 13' of a hopper 7', and an attachment mechanism 17' composed of a pair of brackets 14", 14" and two shafts 15', 16' extending therebetween is mounted on an opposite side of the body 13'.

A double-wing weighing hopper in an automatic weighing apparatus will be described with reference to FIGS. 9 through 13. The weighing hopper 9 has a hopper body 16 in the form of an inverted pyramid having an upper opening and a pair of lower article discharge ports 16a, 16b. A pair of brackets 17, 18 are fixed to opposite sides of the hopper body 16, respectively, and have ends 17a, 18a extending from one side of the hopper body 16. Two locking shafts 19, 20 are mounted on and between the ends 17a, 18a and are positioned out of horizontal alignment with each other at different distances from the hopper body 16. The weighing hopper 9 is supported on a weighing machine 10 by the shafts 19, 20 which engage with upwardly opening recesses 21a and downwardly opening recesses 21b defined in a support member 21 secured to the weighing machine 10. The brackets 17, 18 have ends 17b, 18b projecting from an opposite side of the hopper body 16 and supporting a support shaft 22 of a gate opening and closing link mechanism (described below).

Figure 9:
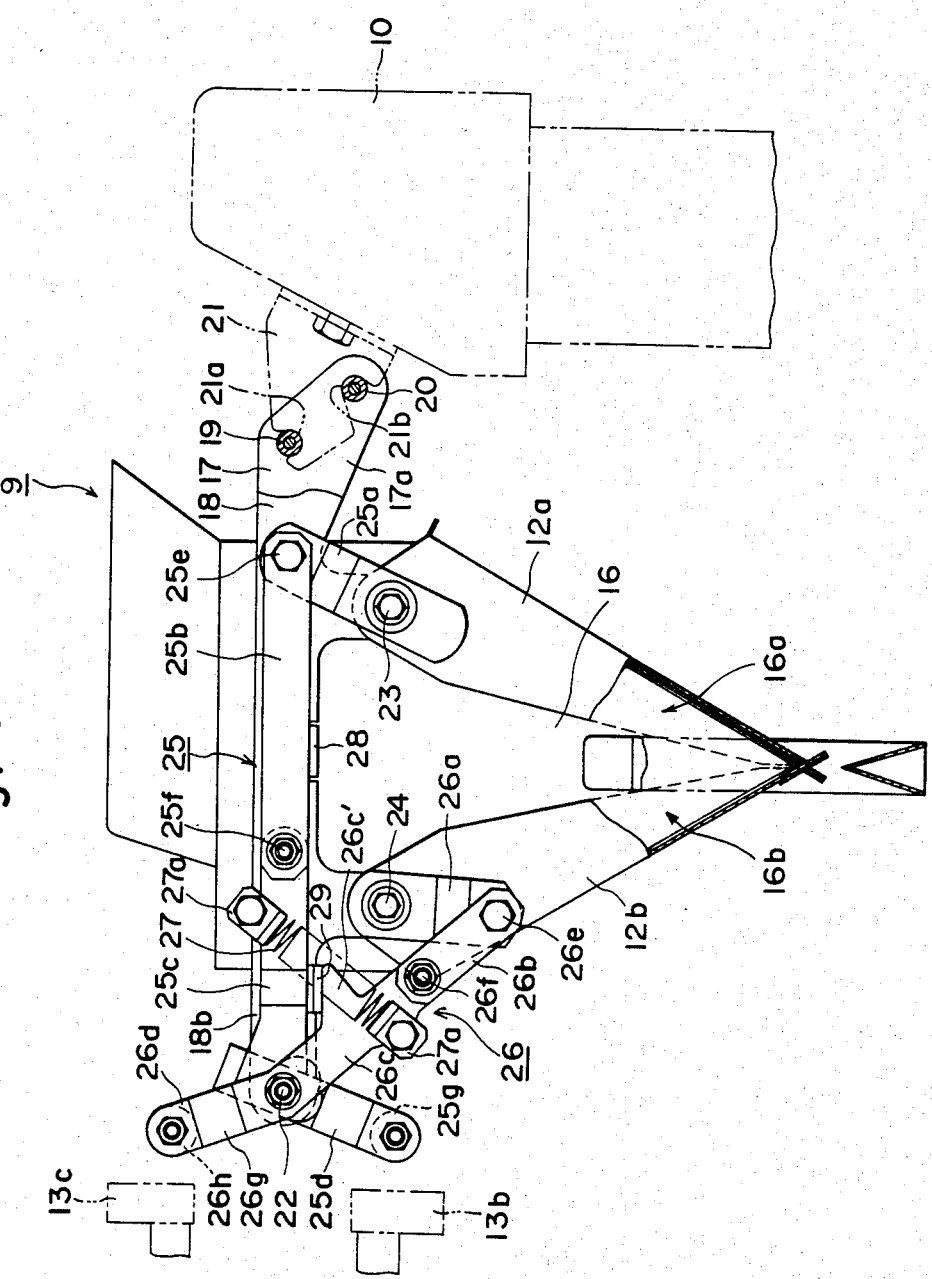
FIG. 9 is a front elevational view of a double-wing hopper according to the present invention.

As illustrated in FIG. 9, the gates 12a, 12b are attached so that they will close the article discharge ports 16a, 16b, respectively. The gates 12a, 12b have upper ends supported by pivot shafts 23, 24 on the brackets 17, 18 and are swingably openable outwardly about the pivot shafts 23, 24, respectively. Link mechanisms 25, 26 for opening and closing the gates 12a, 12b, respectively, are mounted on the same outer side surface of the hopper body 16 on which the bracket 18 is located, the link mechanisms 25, 26 being vertically displaced from each other.

The link mechanism 25 for opening and closing the gate 12a is composed of a follower link 25a swingably movable with the gate 12a about the pivot shaft 23, an intermediate link 25b extending substantially parallel to the bracket 18 outwardly thereof, a drive link 25c supported on the support shaft 22, and an actuation lever 25d supported on the support shaft 22. The follower link 25a has an upper end coupled by a pin 25e to an end of the intermediate link 25b, and the opposite end of the intermediate link 25b is coupled by a pin 25f to an end of the drive link 25c. The drive link 25c and the actuation lever 25d are fixed to each other, and swingably movable about the support shaft 22. The actuation lever 25d supports on an end thereof a pusher bearing roller 25g mounted on the actuation lever 25d by a shaft.

The link mechanism for opening and closing the gate 12b comprises a follower link 26a swingably movable with the gate 12b about the pivot shaft 24, an intermediate link 26b positioned on an oblique imaginary line between a lower end of the follower link 26a and the support shaft 22, a drive link 26c supported on the support shaft 22, and an actuation lever 26d supported on the support shaft 22. The lower end of the follower link 26a is coupled by a pin 26e to an end of the intermediate link 26b, which has an opposite end coupled by a pin 26f to an end of the drive link 26c. The drive link 26c and the actuation lever 26d are fixed to each other through a connector 26g for swingable movement about the support shaft 22. The actuation lever 26d has on an end thereof a pusher bearing roller 26h mounted by a shaft. A tension spring 27 is connected between the link mechanisms 25 and 26 for closing the gates. The tension spring is connected by spring holders 27a, 27a to drive links 25c and 26c, respectively. The gates 12a, 12b are normally maintained in the closed position by the return spring 27 to close the article discharge ports 16a, 16b.

Figure 10:
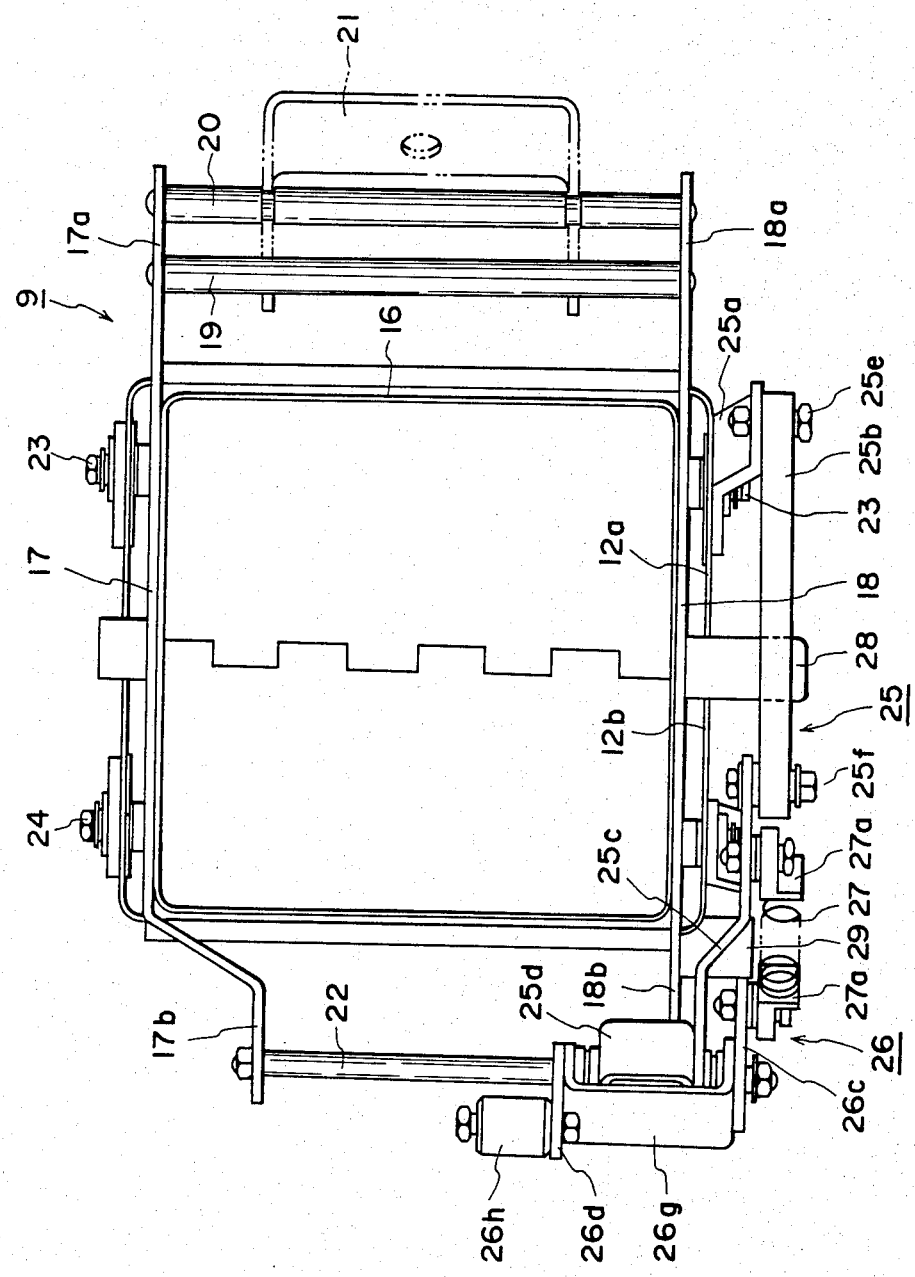
FIG. 10 is a plan view of the double-wing hopper illustrated in FIG. 9.
Figure 11:
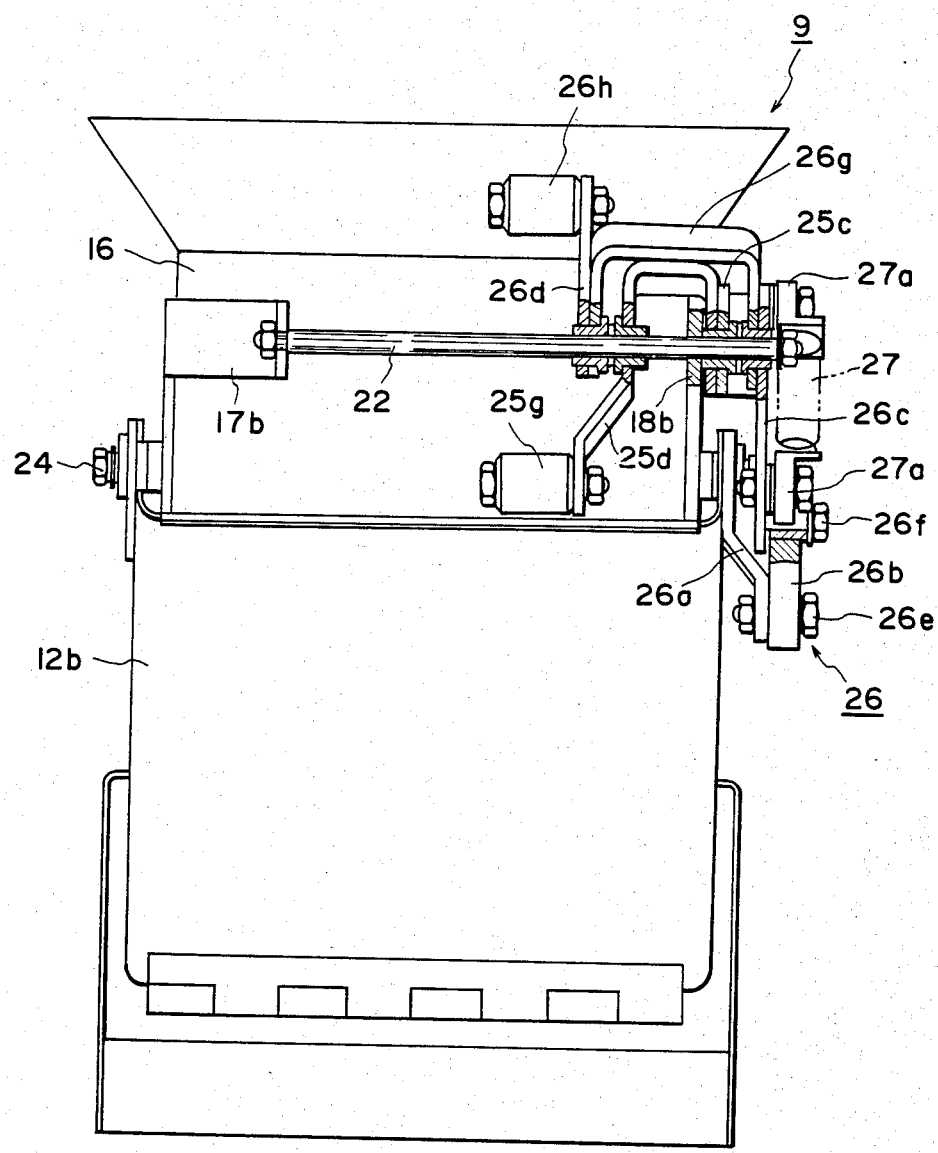
FIG. 11 is a side elevational view, partly in cross section, of the double-wing hopper of FIG. 9.

The stoppers 28, 29 are mounted on the bracket 18 to control the position of the link mechanisms 25, 26 while the gates are closed. As shown in FIGS. 9 and 10, the intermediate link 25b is held in abutment against a stopper 28 under the force of the spring 27 when the gate 12a is in the closed position. A projection 26c' of drive link 26c is held in abutment against a stopper 29 under the force of the spring 27 when the gate 12b is in the closed position. As shown in FIG. 11, the actuation lever 25d and the connector 26g secured respectively to the drive links 25c, 26c of the link mechanisms 25, 26 are channel-shaped and supported in two positions on the support shaft 22. The pusher bearing rollers 25g, 26h mounted on the ends of the actuation levers 25d, 26d are vertically aligned with each other laterally of the hopper body 16.

The operation of the weighing hopper 9 will be described with reference to FIGS. 9 through 13. Articles are dispsersively supplied from a dispersion table through supply troughs and pool hoppers and then into the weighing hoppers 9 as batches. The batches of articles are weighed by the weighing hoppers 9. An optimum combination of measured weights is selected to achieve a desired total weight. The selected batches of articles are discharged from the respective weighing hoppers 9 into an inner chute or an outer chute of a collection chute when either the gate 12a or the gate 12b of each of the selected weighing hoppers 9 is opened by projecting movements of the pusher members 13b or the pusher members 13c of the corresponding driver units 10. The discharged articles are collected by the selected chute, and then supplied to a packaging apparatus (not shown) disposed below the collection chute. A pusher member of the driver unit projects toward each of the pool hoppers 7 corresponding to the weighing hoppers 9 from which the articles have been discharged, thereby causing a link mechanism to open the gate of a corresponding pool hopper positioned above the weighing hopper. A batch of articles is immediately supplied to the weighing hopper 9 from the pool hopper 7 in preparation for another cycle of the weighing operation.

During such weighing and discharging operation of articles contained in the weighing hoppers, the link mechanisms 25, 26 on the weighing hopper 9 are biased under the force of the return spring 27 acting on the drive links 25c, 26c to keep the gates 12a, 12b in a closed position, as illustrated in FIG. 9. When the gates are in the closed position, the intermediate link 25b and drive link 25c of the link mechanism 25 are positioned on a horizontal straight line connecting the support shaft 22 and the pin 25e, and the intermediate link 26b and drive link 26c of the link mechanism 26 are also positioned on a horizontal straight line connecting the support shaft 22 and the pin 26e. Therefore, these links are in their dead-point position, in order to prevent the gates 12a, 12b from being opened by the weight of the articles contained in the weighing hoppers 9.

Figure 12:
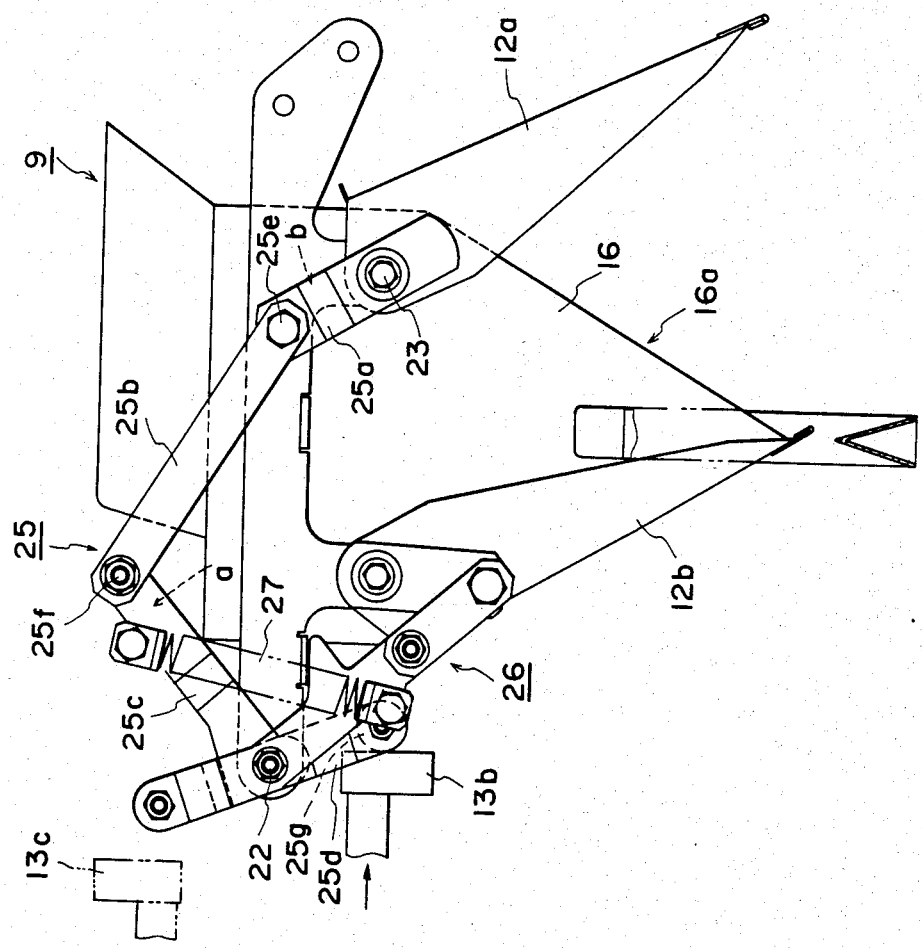
FIGS. 12 and 13 are side elevational views showing the manner in which a link mechanism operates to open and close the gates of the double-wing hopper of FIG. 9.

When the pusher member 13b of the driver unit projects, the pusher bearing roller 25g of the link mechanism 25 is pushed and the actuation lever 25 and the drive link 25c ae turned in a counterclockwise direction, i.e., in the direction of the arrow a of FIG. 12, about the support shaft 22. The rotation of the actuation lever 25 and drive link 25c lifts the drive link 25c and the intermediate link 25b out of horizontal alignment to push up the pin 25. The intermediate link 25b is rotated in a counterclockwise direction as shown and the follower link 25a is also rotated in this manner, i.e., in the direction of the arrow b, thereby causing the gate 12a to turn outwardly about the pivot shaft 23. The article discharge port 16a is thus opened. When the pusher member 13b is retracted after the articles have been discharged, the gate 12a quickly closes the article discharge port 16a under the resilient force of the return spring 27.

Figure 13:
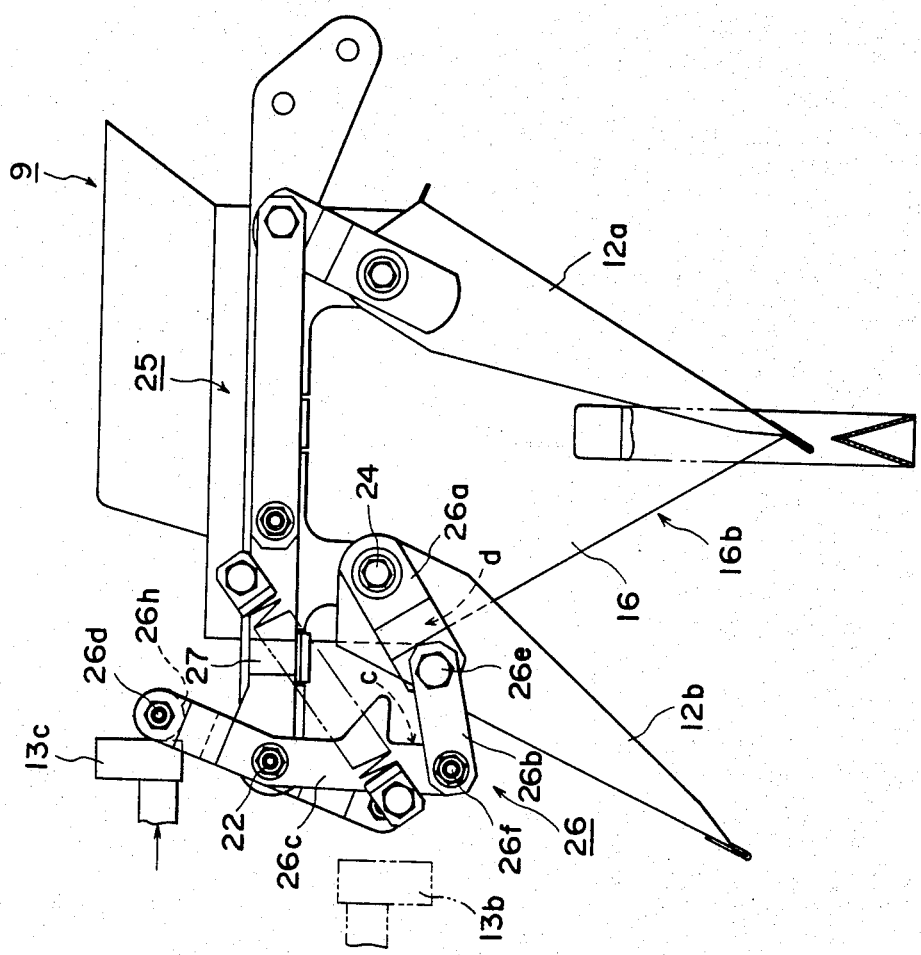

When the other pusher 13c of the driver unit projects to push the pusher bearing roller 26h of the link mechanism 26, the actuation lever 26d and the drive link 26c are rotated in a clockwise direction, i.e., in the direction of the arrow c of FIG. 13, about the support shaft 22. The drive link 26c and the intermediate link 26b are lifted out of horizontal alignment to move the pin 26f to the left as shown. The intermediate link 26b is rotated in a counterclockwise direction and the follower link 26a is also rotated in a clockwise direction, i.e., in the direction of the arrow d, thereby causing the gate 12b to turn outwardly about the pivot shaft 24. The article discharge port 16b is thus opened. When the pusher member 13c is retracted after the articles have been discharged, the gate 12b quickly closes the article discharge port 16b under the resilient force of the return spring 27. The gates 12a, 12b are thus opened and closed alternately to supply the weighed articles to the packaging apparatus at short time intervals through the outer and inner chutes of the collection chute.

In the above embodiment, the present invention is applied to the weighing hopper 9. However, the arrangement of the invention is equally incorporated in a pool hopper having two gates which are to be alternately closed and opened.

Figure 14:
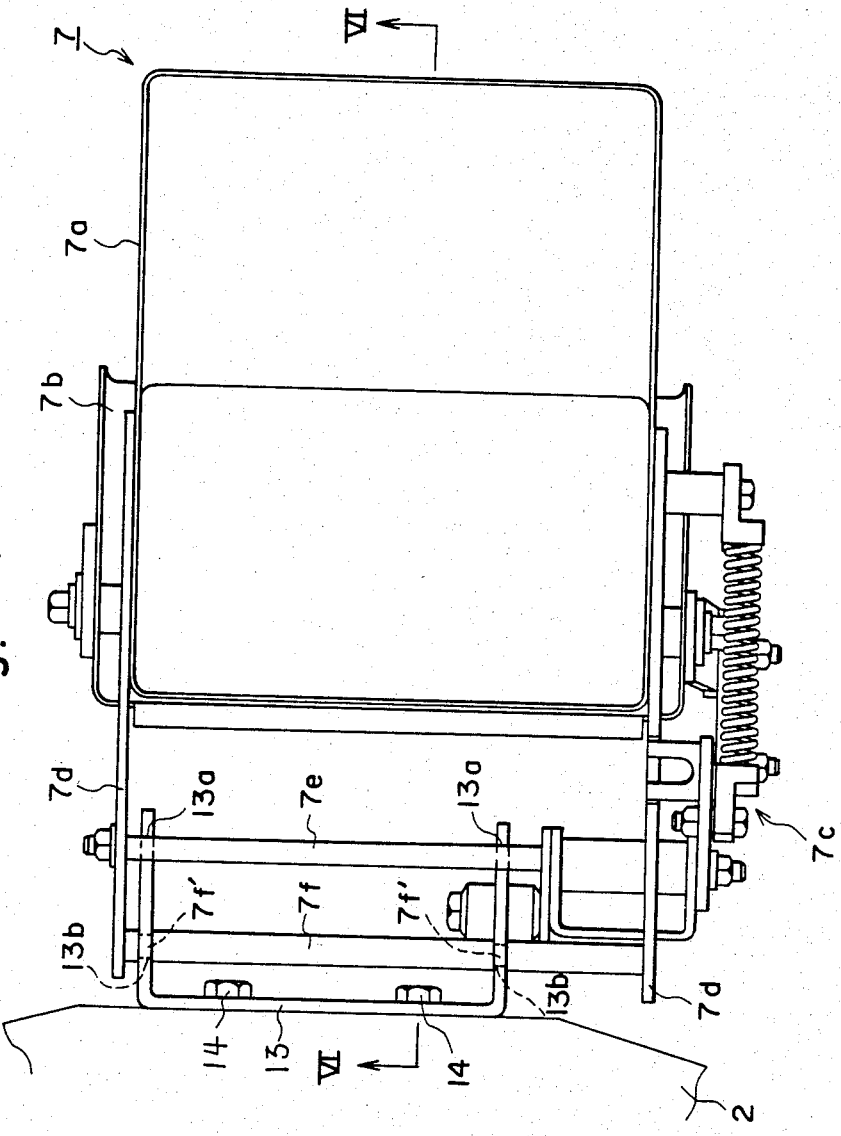
FIG. 14 is a plan view of a hopper attachment mechanism according to the present invention.
Figure 15:
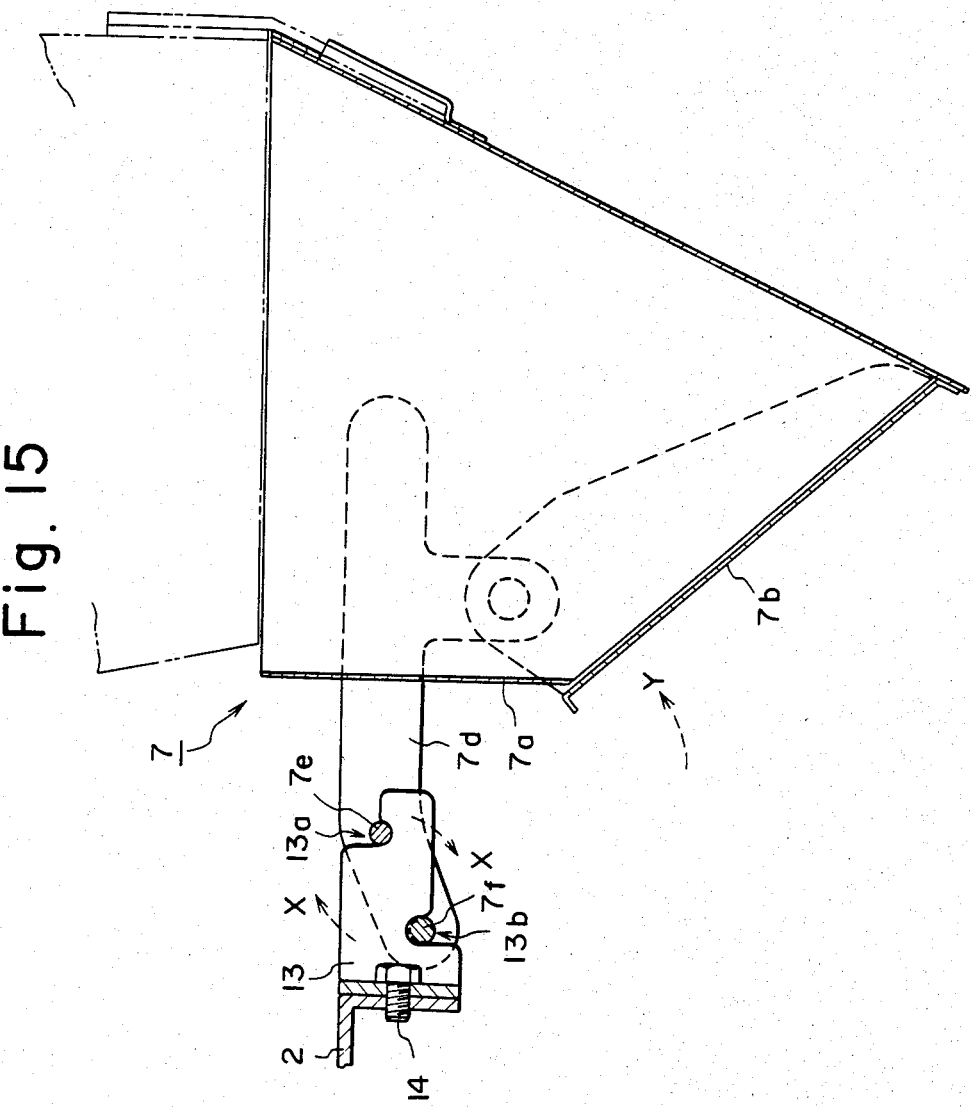
FIG. 15 is a vertical cross-sectional view taken along line VI—VI of FIG. 14.
Figure 16:
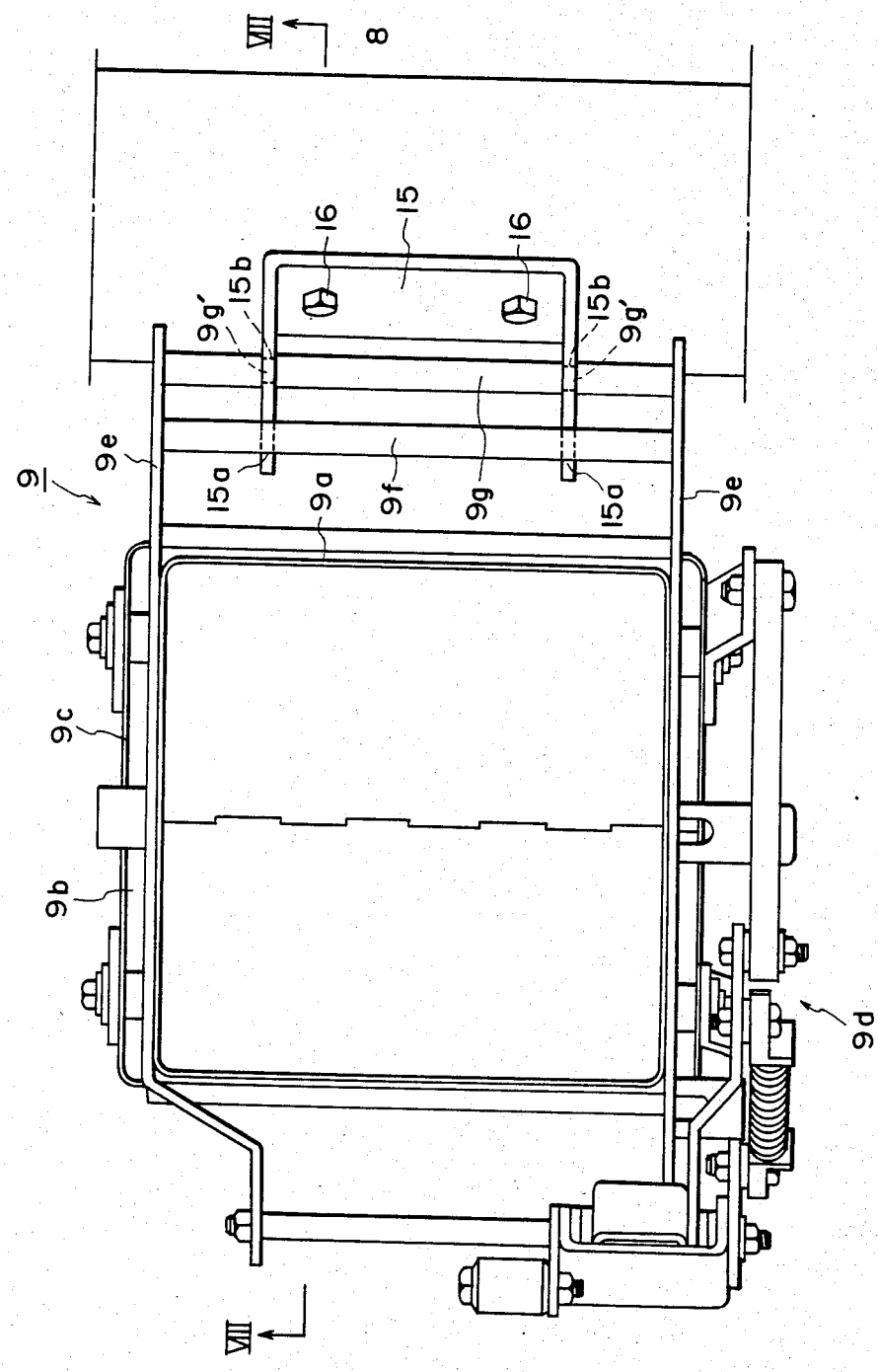
FIG. 16 is a plan view of a hopper attachment mechanism according to another embodiment of the present invention.

An attachment structure for a hopper in an automatic weighing apparatus will be described in greater detail with reference to FIGS. 14 through 17. As shown in FIGS. 14 and 15, each pool hopper 7 has a gate 18 for opening and closing a discharge port defined in a hopper body 7a and a link mechanism 7c for opening and closing the gate 7b. A pair of brackets 7d, 7d projects laterally (inwardly into the apparatus) from opposite sides of the hopper body 7a. Two parallel shafts 7e, 7f extend between the brackets 7d, 7d and are positioned out of horizontal alignment, the shafts 7e, 7f are also differently spaced from the hopper body 7a. As shown in FIGS. 16 and 17, each weighing hopper 9 has a pair of gates 9b, 9c for opening and closing discharge ports defined in a hopper body 9a and a link mechanism 9d for opening and closing the gates 9b, 9c. A pair of brackets 9e, 9e projects laterally (inwardly into the apparatus) from opposite sides of the hopper body 9a. Two parallel shafts 9f, 9g extend between the brackets 9e, 9e and are positioned out of horizontal alignment, the shafts 9f, 9g are also differently spaced from the hopper body 9a.

The pool hopper 7 is attached to a peripheral edge of a support table 2 (FIG. 14) to which a channel-shaped attachment member 13 is fastened by means of bolts 14, 14. The attachment member 13 includes opposite sides having upwardly opening recesses 13a, 13a and downwardly opening recesses 13b, 13b defined therein. The weighing hopper 9 is mounted on a weighing machine 8 (FIG. 16) to which there is fastened a channel-shaped attachment member 15 by means of bolts 16, 16. The attachment member 15 has upwardly opening recesses 15a, 15a and downwardly opening recesses 15b, 15b defined in opposite sides thereof. The pool hopper 7 is mounted on the support table 2 with the shaft 7e closer to the hopper body 7a being received in the upwardly opening recesses 13a, 13a and the shaft 7f remote from the hopper body 7a being received in the downwardly opening recesses 13b, 13b. The weighing hopper 9 is mounted on the weighing machine 8 with the shaft 9f closer to the hopper body 9a received in the upwardly opening recesses 15a, 15a and the shaft 9g remote from the hopper body 9a being received in the downwardly opening recesses 15b, 15b.

The pool hopper 7 can be detached with utmost ease simply by tilting the pool hopper 7 in the direction of the arrow Y (FIG. 15) to take the shaft 7f out of the downwardly opening recesses 13b, 13b. The weighing hopper 9 can also be supported and dismounted in the same manner as described above.

With the arrangements of the present invention, hoppers having gate opening and closing link mechanisms and the attachment mechanisms and attachment members are of a simplified construction, can be manufactured inexpensively, and are light in weight. The attachment mechanism of the invention supports the hopper without allowing the latter from suffering vibrations or wobbling movements, thus reducing noise. Where the weighing hopper is mounted by the attachment mechanism, the weighing hopper is protected from adverse effects induced by vibrations, wobbling movements and noise, with the result that the accuracy of weighing operation can be increased. The hoppers are further simplified in construction since certain parts are shared by the link mechanism and the attachment mechanism.

In the case where an automatic weighing apparatus has hoppers each equipped with a pair of gates, link mechanisms for opening and closing the pair of gates are mounted on the same outer side surface of the hopper body. This reduces the width of the hopper body as compared with an arrangement in which the link mechanisms for the two gates are positioned respectively on the opposite outer side surfaces of the hopper body. When the hoppers are arranged in a circular pattern, they can be closely spaced through the reduction of the width thereof, so that the automatic weighing apparatus can be smaller in overall size or alternatively, more hoppers and weighing machines can be installed for increased availability of combinations of weighing machines during weighing operation, with a resultant improved weighing accuracy.

Certain parts, such as for example, the return spring for urging the gates to return to their closed position, can be shared by the link mechanisms for opening and closing the pair of gates thereby reducing the number of parts used. Where the weighing hoppers are equipped with the link mechanisms, any vibrations caused at the time of charging articles to be weighed are high-frequency vibrations which can technically be removed through the lightweight weighing hoppers. Such vibrations can therefore be attenuated or prevented from being transmitted to the weighing machines, which can then be stabilized in a short period of time for an increased weighing speed and accuracy.

Although certain preferred embodiments have been shown and described, it should be understood that many changes and modifications may be made therein without departing from the scope of the appended claims.

What we claim is:

1. A hopper for use in an automatic weighing apparatus, comprising:
    a body having a discharge port and first and second sides;
    a gate, swingably mounted on said body, for opening and closing aid discharge port;
    first and second brackets respectively fixed to said first and second sides of said body;
    a link mechanism, for opening and closing said gate, including a drive link pivotably supported on said first bracket, a follower link angularly movable with said gate, and an intermediate link coupled to and between angularly movable ends of said drive and follower links, so that said drive and intermediate links are aligned along a substantially straight line when said discharge port is closed by said gate;
    an attachment member having upwardly and downwardly opening recesses; and
    an attachment mechanism, for removably attaching the hopper to said attachment member, including first and second parallel shafts mounted on and between said first and second brackets for engaging said upwardly and downwardly opening recesses, respectively.

2. An automatic weighing apparatus comprising:
    a plurality of weighing machines arranged in a circular pattern;
    a plurality of double-wing hoppers arranged in a circular pattern in alignment with respective ones of said weighing machines, each of said double-wing hoppers including a body having a pair of lower article discharge ports and a pair of gates pivotably mounted on said body and independently movable to close and open said article discharge ports; and
    a pair of link mechanisms operatively mounted on one outer side surface of each of the bodies of said double-wing hoppers for opening and closing said gates, each link mechanism including—an actuation lever, a drive link fixed to said actuation lever, a follower link mounted on and swingable with a respective one of said gates, an intermediate link interconnecting said drive link and said follower link and a spring connected between said link mechanisms for closing said gate.

3. A hopper body for use in an automatic weighing apparatus, comprising:

a pair of brackets attached to and projecting from the hopper body;

first and second parallel shafts mounted on and between said brackets, said first parallel shaft being closer to said body than said second parallel shaft; and an attachment member mounted on the automatic weighing apparatus having upwardly opening recesses for receiving said first parallel shaft and downwardly opening recesses for receiving said second parallel shaft.

4. A hopper body according to claim 3, wherein said hopper body is a pool hopper for pooling a batch of articles to be weighed.

5. A hopper body according to claim 3, wherein said hopper body is a weighing hopper for weighing a batch of articles.

* * * * *

UNITED STATES PATENT AND TRADEMARK OFFICE
CERTIFICATE OF CORRECTION

PATENT NO. : 4,527,647
DATED : July 9, 1985
INVENTOR(S) : Ueda

It is certified that error appears in the above-identified patent and that said Letters Patent is hereby corrected as shown below:

```
Col. 8, line 24, "ae" should be --are--;
        line 29, "25" should be --25f--.
Col. 10, line 34, "aid" should be --said--.
```

Signed and Sealed this

Tenth Day of December 1985

[SEAL]

Attest:

Attesting Officer

DONALD J. QUIGG

Commissioner of Patents and Trademarks